US011996075B2

(12) United States Patent
You et al.

(10) Patent No.: US 11,996,075 B2
(45) Date of Patent: May 28, 2024

(54) SOUND CONTROL DEVICE AND CONTROL METHOD THEREOF

(71) Applicants: HYUNDAI MOTOR COMPANY, Seoul (KR); Kia Corporation, Seoul (KR)

(72) Inventors: Jung Keun You, Suwon-si (KR); Myoung Ok Lee, Seoul (KR); Kaang Dok Yee, Yongin-si (KR); Chi Sung Oh, Hwaseong-si (KR); Mun Hwan Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 8 days.

(21) Appl. No.: 17/865,281

(22) Filed: Jul. 14, 2022

(65) Prior Publication Data

US 2023/0197047 A1 Jun. 22, 2023

(30) Foreign Application Priority Data

Dec. 21, 2021 (KR) ........................ 10-2021-0184099

(51) Int. Cl.
*G10K 11/178* (2006.01)
*H04R 3/12* (2006.01)

(52) U.S. Cl.
CPC .... *G10K 11/17815* (2018.01); *G10K 11/1783* (2018.01); *G10K 11/17854* (2018.01); *H04R 3/12* (2013.01); *G10K 11/17883* (2018.01); *H04R 2499/13* (2013.01)

(58) Field of Classification Search
CPC ........... G10K 11/178; G10K 11/17823; G10K 11/17854; G10K 2210/12; G10K 2210/12821; G10K 11/17881
See application file for complete search history.

(56) References Cited

U.S. PATENT DOCUMENTS

| | | | | |
|---|---|---|---|---|
| 10,347,236 | B1 * | 7/2019 | Bastyr .............. | G10K 11/17823 |
| 2020/0079168 | A1 | 3/2020 | Suzuki et al. | |

FOREIGN PATENT DOCUMENTS

| | | | |
|---|---|---|---|
| JP | 4434213 | B2 | 3/2010 |
| JP | 5071538 | B2 | 11/2012 |
| JP | 5273237 | B2 | 8/2013 |
| JP | 5411235 | B2 | 2/2014 |
| JP | 5549334 | B2 | 7/2014 |

* cited by examiner

*Primary Examiner* — Kile O Blair
(74) *Attorney, Agent, or Firm* — Morgan, Lewis & Bockius LLP

(57) ABSTRACT

A method for controlling a sound control device in a vehicle includes obtaining at least one of a reference signal obtained from a sensor or an error signal obtained from a sound signal of a microphone, estimating a road surface environment corresponding to a road surface on which the vehicle is traveling based on the reference signal, and adjusting a gain for generating a noise control signal having a magnitude within a preset range based on at least one of the road surface environment or the error signal.

9 Claims, 7 Drawing Sheets

SOUND CONTROL DEVICE AND CONTROL METHOD THEREOF

CROSS-REFERENCE TO RELATED APPLICATION

The present application claims priority to Korean Patent Application No. 10-2021-0184099, filed on Dec. 21, 2021, the entire contents of which is incorporated herein for all purposes by this reference.

BACKGROUND OF THE PRESENT DISCLOSURE

Field of the Present Disclosure

The present disclosure relates to a sound control device and a control method thereof.

Description of Related Art

The content described below merely provides background information related to the present disclosure and does not form the related art.

When a vehicle is traveling, noise occurs due to air and structural noise of the vehicle. For example, noise generated by an engine of a vehicle, noise generated by friction between the vehicle and a road surface, vibration transmitted through a suspension device, wind noise generated by wind, etc. are generated.

As a method for reducing such noise, there are a passive noise control method of installing a sound absorbing material that absorbs noise inside a vehicle, and an active noise control (ANC) method of using a noise control signal having a phase opposite to the phase of the noise.

Because the passive noise control method has limitations in adaptively removing various noises, research on the active noise control method is being actively conducted. A road-noise active noise control (RANC) method for removing road noise of a vehicle is attracting attention.

To perform active noise control, an audio system of the vehicle generates a noise control signal which has the same amplitude as an internal noise of the vehicle and has a phase opposite to the phase of the internal noise, and outputs the noise control signal to the interior of the vehicle to cancel the internal noise.

The audio system of the vehicle can reproduce audio as well as eliminate the internal noise of the vehicle. For example, the audio system of the vehicle can output an audio signal related to music simultaneously with a noise control signal. Accordingly, an occupant can listen to only music without road noise.

However, since a conventional audio system simply mixes the noise control signal and the audio signal and outputs the mixed signal without considering other limitations, it may be difficult to efficiently eliminate noise or may cause a new problem.

For example, from a cognitive perspective, for a person to well hear an audio signal mixed with noise, the magnitude of the audio signal may be large. When the magnitude of an audio signal is constant, a person perceives the magnitude of the audio signal differently depending on the level of noise, which may cause the person to feel a poor audio quality.

The conventional audio system equalizes the audio signal without considering the noise in the vehicle. That is, the conventional audio system outputs an audio signal with a constant magnitude for each frequency band. An occupant perceives the magnitude of the audio signal differently depending on the level of noise in the vehicle, which may cause the occupant to feel a poor audio quality.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling a sound control device in a vehicle. The method includes obtaining at least one of a reference signal obtained from a sensor or an error signal obtained from a sound signal of a microphone, estimating a road surface environment corresponding to a road surface on which the vehicle is traveling based on the reference signal, and adjusting a gain for generating a noise control signal having a magnitude within a preset range based on at least one of the road surface environment or the error signal.

According to at least another aspect, the present disclosure provides a sound control device. The sound control device includes a signal collector configured for obtaining at least one of a reference signal obtained from a sensor or an error signal obtained from a sound signal of a microphone, an estimator configured for estimating a road surface environment corresponding to a road surface on which the vehicle is traveling based on the reference signal, and a gain controller configured for adjusting a gain for generating a noise control signal having a magnitude within a preset range based on at least one of the road surface environment or the error signal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
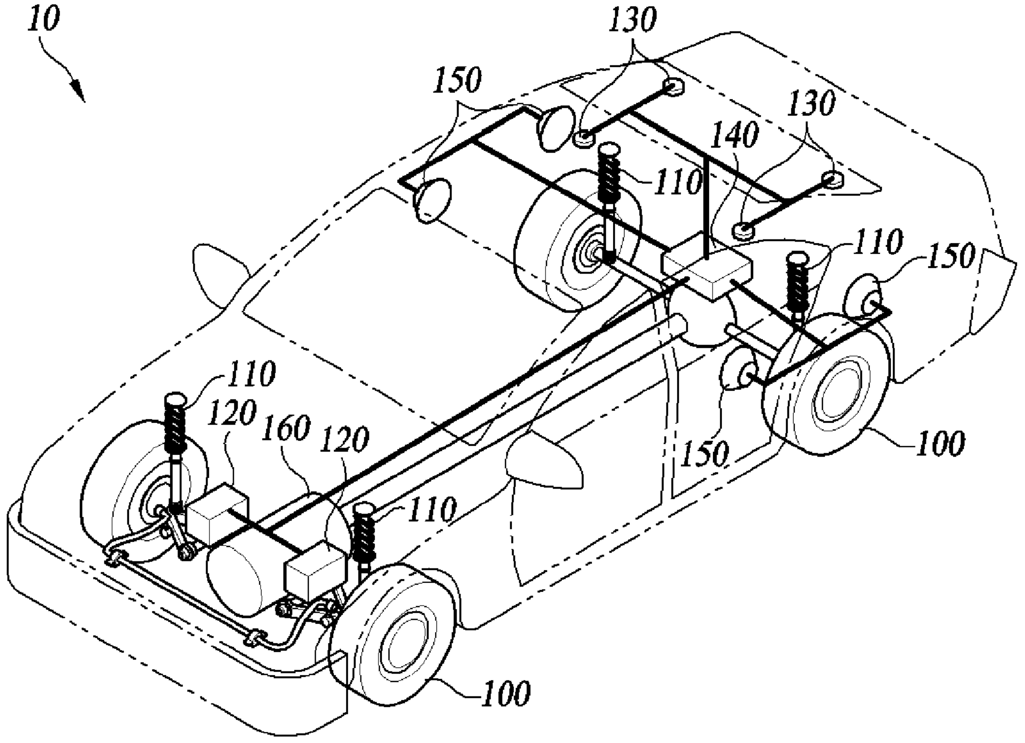
FIG. 1 is a schematic diagram illustrating components of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when determined that a detailed description of related known functions or configurations may obscure the subject matter of the present disclosure, the detailed description thereof has been omitted.

Furthermore, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes' or 'is provided with' a certain component, it means that other components may be further included, without excluding other components, unless otherwise explicitly stated.

Each component of the device or method according to an exemplary embodiment of the present disclosure may be implemented as hardware or software, or a combination of hardware and software. Furthermore, the function of each component may be implemented as software and a microprocessor may execute the function of software corresponding to each component.

In view of the above, the present disclosure provides an active noise control method and device configured for improving the performance of active noise control in consideration of the relationship between a noise control signal and an audio signal, the characteristics of a noise signal, and the characteristics of a speaker, and the like.

Furthermore, the present disclosure provides an active noise control method and device configured for improving the performance of active noise control by accurately modeling a noise transfer path using a virtual sensor and a virtual microphone.

Furthermore, the present disclosure provides a sound control device and a control method thereof for preventing a magnitude of an audio signal perceived by an occupant from being changed depending on the level of residual noise after active noise control.

Furthermore, the present disclosure provides a sound control device and a control method thereof for adjusting a magnitude of a noise control signal which varies according to roughness of road surface within the limit performance of a speaker.

FIG. 1 is a schematic diagram illustrating components of a vehicle according to an exemplary embodiment of the present disclosure.

Referring FIG. 1, a vehicle 10 includes wheels 100, a suspension device 110, accelerometers 120, a microphone 130, a controller 140, a speaker 150, and an axle 160. The number and the arrangement of the components shown in FIG. 1 in an exemplary embodiment are exemplified for illustrative purpose only, and may vary in another exemplary embodiment of the present disclosure.

The vehicle 10 includes a chassis on which accessories necessary for traveling are mounted, and an audio system that performs an active noise control.

The chassis of the vehicle 10 includes front wheels respectively provided on the left and right sides of the front of the vehicle 10 and rear wheels respectively provided on the left and right sides of the rear of the vehicle 10. The chassis of the vehicle 10 further includes an axle 160 as a power transmission unit. The chassis of the vehicle 10 also includes a suspension device 110. Furthermore, the vehicle 10 may further include at least one of a power unit, a steering unit, or a braking unit. Also, the chassis of the vehicle 10 may be coupled to a body of the vehicle 10.

The suspension device 110 is a device configured for alleviating vibration or impact of the vehicle 10. A vibration due to a road surface is applied to the vehicle 10 while the vehicle 10 is traveling. The suspension device 110 alleviates vibration applied to the vehicle 10 using a spring, an air suspension device, or the like. The suspension device 110 may improve the riding comfort of an occupant in the vehicle 10 through shock mitigation.

However, noise due to the suspension device 110 may be generated in the interior of the vehicle 10. Although the suspension device 110 can alleviate a large vibration applied to the vehicle 10, it is difficult to remove a minute vibration generated by the friction between the wheels 100 and the road surface. Such minute vibrations generate noise in the interior of the vehicle 10 through the suspension device 110.

Furthermore, noise generated by the friction between the wheels 100 and the road surface, noise generated by an engine, which is a power device, or wind noise generated by wind, etc. may flow into the interior of the vehicle 10.

To eliminate the internal noise of the vehicle 10, the vehicle 10 may include an audio system.

The audio system of the vehicle 10 may predict the internal noise from the vibration of the vehicle 10, and remove the internal noise of the vehicle 10 using a noise control signal which has the same amplitude as the amplitude of the noise signal with respect to the internal noise of the vehicle 10 and has a phase opposite to the phase of the noise signal.

To the present end, the audio system includes an accelerometer 120, a microphone 130, a controller 140, and a speaker 150. The audio system may further include an amplifier (AMP).

The accelerometer 120 measures acceleration or vibration of the vehicle 10 and transmits a reference signal representing an acceleration signal to the controller 140. The reference signal is used to generate a noise control signal.

The accelerometer 120 may measure vibration generated by the friction between the wheels 100 and the road surface. To the present end, the accelerometer 120 may be provided on the suspension device 110, a connecting mechanism connecting the wheels 100 and the axle 160, or a vehicle body.

The accelerometer 120 transmits a reference signal as an analog signal to the controller 140. Otherwise, the accelerometer 120 may convert the reference signal into a digital signal and transmit the converted digital signal to the controller 140.

The audio system may use at least one of a gyro sensor, a motion sensor, a displacement sensor, a torque sensor, or a microphone instead of the acceleration sensor to measure the vibration of the vehicle 10. That is, the audio system may include a sensing unit, and the sensing unit may include at least one of the acceleration sensor, the gyro sensor, the motion sensor, the displacement sensor, the torque sensor, or the microphone.

The microphone 130 detects a sound in the vehicle 10 and transmits a sound signal to the controller 140. For example, the microphone 130 may detect noise in the vehicle 10 and transmit a noise signal to the controller 140.

The microphone 130 may measure a sound pressure of about 20 to 20 kHz, which is a human audible frequency band. The range of the measurable frequency of the microphone 130 may be narrower or wider.

In an exemplary embodiment of the present disclosure, the microphone 130 may measure internal noise generated by the friction between the wheels 100 and the road surface.

When the noise control signal is output to the interior of the vehicle 10, the microphone 130 may measure the noise signal remaining in the interior of the vehicle 10 in an environment in which the internal noise of the vehicle 10 decreases by the noise control signal. The remaining signal is referred to as an error signal or a residual signal. The error signal may be used as information for determining whether the noise in the vehicle 10 is normally reduced or eliminated.

When an audio signal is output to the interior of the vehicle 10, the microphone 130 may measure the error signal and the audio signal together.

The microphone 130 may be provided on a headrest of a seat, a ceiling or an internal wall of the vehicle 10. The microphone 130 may be provided in a plurality of positions, or in a form of a microphone array.

The microphone 130 may be implemented as a capacitor type sensor. To intensively measure noise, the microphone 130 may be implemented as a directional microphone.

According to an exemplary embodiment of the present disclosure, the microphone 130 may operate as a virtual microphone generated at the position of an occupant's ear by the controller 140.

According to an algorithm such as least mean square (LMS) or filtered-x least mean square (FxLMS) known in the art, the controller 120 may determine coefficients of an adaptive filter (often referred to as W-filter) based on the error signal(s) and the reference signal(s). The noise control signal may be generated by an adaptive filter based on a reference signal or a combination of reference signals. When the noise control signal is output through the speaker 150 via the amplifier, the noise control signal has an ideal waveform so that a destructive sound is generated near the occupant's ear and the microphone 130, wherein the destructive sound has the same amplitude as a road noise heard by passengers in the vehicle cabin and has an opposite phase to the phase of the road noise. The destructive sound from the speaker 150 is added together with the road noise in the vicinity of the microphone 130 in the vehicle cabin, lowering the sound pressure level due to the road noise at the present location.

The controller 140 may convert a reference signal and a noise signal, which are analog signals, into a digital signal, and generate a noise control signal from the converted digital signal.

The controller 140 transmits the noise control signal to the amplifier.

The amplifier receives the noise control signal from the controller 140 and an audio signal from an Audio, Video, and Navigation (AVN) device.

The amplifier may mix the noise control signal and the audio signal, and output the mixed signal through a speaker. Furthermore, the amplifier may adjust the amplitude of the mixed signal using power amplifiers. The power amplifiers may include vacuum tubes or transistors for amplifying the power of the mixed signal.

The amplifier transmits the mixed signal to the speaker 150.

The speaker 150 receives the mixed signal, which is an electrical signal, from the amplifier, and outputs the mixed signal to the interior of the vehicle 10 in a form of a sound wave. Noise in the interior of the vehicle 10 may be reduced or eliminated by the output of the mixed signal.

The speaker 150 may be provided at a plurality of positions inside the vehicle 10.

The speaker 150 may output the mixed signal only to a specific occupant as needed. The speaker 150 may cause constructive interference or destructive interference at the position of the specific occupant's ear by outputting the mixed signals of different phases at a plurality of positions.

Figure 2:
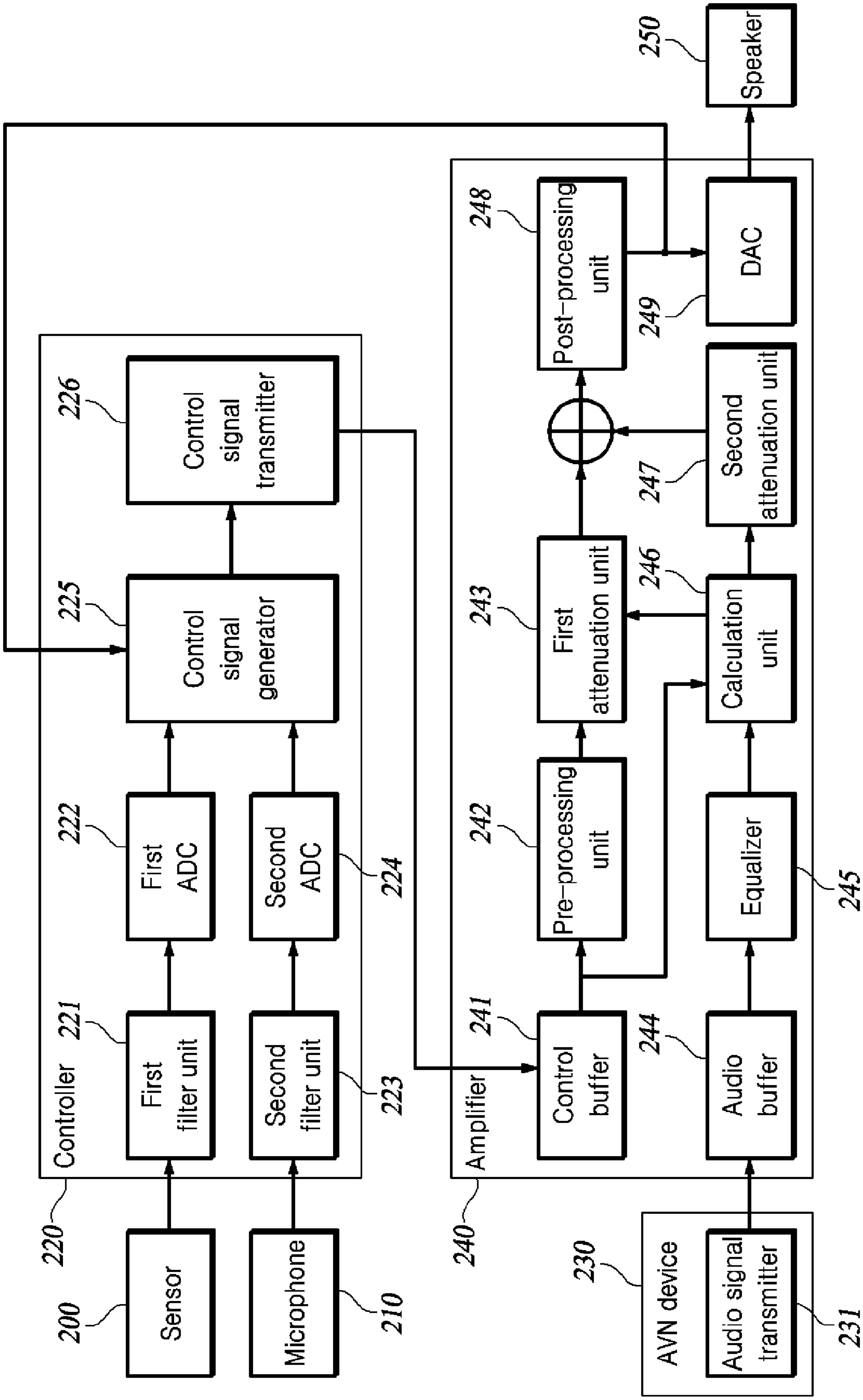
FIG. 2 is a block diagram illustrating components of an audio system according to an exemplary embodiment of the present disclosure.

FIG. 2 is a block diagram illustrating components of an audio system according to an exemplary embodiment of the present disclosure.

Referring to FIG. 2, the audio system of the vehicle includes a sensor 200, a microphone 210, a controller 220, an AVN device 230, an amplifier 240, and a speaker 250. In FIG. 2, the sensor 200, the microphone 210, the controller 220, the AVN device 230, the amplifier 240, and the speaker 250 may respectively correspond to the accelerometer 120, the microphone 130, the controller 140, the AVN device, the amplifier, and the speaker 150 described with reference to FIG. 1.

Hereinafter, the noise signal may be noise measured at various positions including the position of an occupant's ear.

The noise control signal is a signal for eliminating or attenuating the noise signal. The noise control signal is a signal that has the same amplitude as the noise signal and has an opposite phase to the phase of the noise signal.

The error signal is the residual noise measured after the noise signal is canceled by the noise control signal at the noise control point. The error signal may be measured by a microphone. When the microphone measures the error signal and the audio signal together, the audio system can identify the error signal since knowing the audio signal. In the instant case, the position of the microphone may be approximated to be the position of the occupant's ear, which is the noise control point.

Referring back to FIG. 2, the sensor 200 measures an acceleration signal of the vehicle as a reference signal. The sensor 200 may include at least one of an acceleration sensor, a gyro sensor, a motion sensor, a displacement sensor, a torque sensor, or a microphone.

The microphone 210 measures an acoustic signal in the vehicle. Here, the acoustic signal measured by the microphone 210 includes at least one of a noise signal, an error signal, or an audio signal.

When the noise control signal is being output to the interior of the vehicle, the microphone 210 may measure the error signal. When an audio signal is being output to the interior of the vehicle, the microphone 130 may measure the error signal and the audio signal together.

The controller 220 generates a noise control signal according to the reference signal. The noise control signal is a signal having the same magnitude as that of the internal noise of the vehicle, and having a phase opposite to that of the internal noise. When the noise control signal is being output, the controller 220 may generate the noise control signal based on the reference signal and the error signal. When an audio signal is being output, the controller 220 may extract an error signal from the acoustic signal measured by the microphone 210 and generate a noise control signal based on the reference signal and the error signal.

Meanwhile, in the exemplary embodiment, the magnitude of the signal may refer to any one of sound pressure, sound pressure level, energy, and power. Otherwise, the magnitude of the signal may refer to any one of an average amplitude, an average sound pressure, an average sound pressure level, an average energy, or an average power of the signal.

The controller 220 may independently control the noise control signal to be output regardless of whether the audio function of the AVN device 230 is operating. That is, the controller 220 may always operate in the driving situation of the vehicle. When the audio function of the AVN device 230 is turned on, the controller 220 may control the noise control signal and the audio signal to be output together. The controller 220 may control only the noise control signal to be output when the audio function of the AVN device 230 is turned off.

The controller 220 may be connected to other components of the audio system through an A2B (Automotive Audio Bus) interface.

Meanwhile, the AVN device 230 is provided in a vehicle and executes audio, video, and navigation programs according to a request of an occupant.

The AVN device 230 may transmit an audio signal to the amplifier 240 using an audio signal transmitter 231. The audio signal transmitted to the amplifier 240 is output to the interior of the vehicle through the speaker 250. For example, when the AVN device 230 transmits an audio signal related to music to the amplifier 240 under the control of an occupant, the amplifier 240 and the speaker 250 may reproduce music according to the audio signal. Furthermore, the AVN device 230 may provide driving information of the vehicle, road information, or navigation information to the occupant using a video output device such as a display.

The AVN device 230 may communicate with an external device using a communication network supporting a mobile communication standard such as 3G (Generation), Long Term Evolution (LTE), or 5G. The AVN device 230 may receive information of nearby vehicles, infrastructure information, road information, traffic information, and the like through communication.

The amplifier 240 mixes the noise control signal and the audio signal, processes the mixed signal, and outputs the processed signal through the speaker 250. Otherwise, after processing the noise control signal or the audio signal, the amplifier 240 may mix the noise control signal and the audio signal.

The amplifier 240 may perform appropriate processing on the mixed signal in consideration of the characteristics of the noise control signal, the audio signal, or the speaker 250. For example, the amplifier 240 may adjust the magnitude of the mixed signal. To the present end, the amplifier 240 may include at least one amplifier.

The amplifier 240 may feedback the processed signal to the controller 220.

The amplifier 240 according to an exemplary embodiment of the present disclosure may be configured integrally with the controller 220. As an exemplary embodiment of the present disclosure, the controller 220 and the amplifier 240 are integrally configured and may be provided in a headrest of a seat.

The controller 220 may generate a noise control signal for eliminating an error signal among various sounds in the vehicle using the processed signal.

The speaker 250 receives the processed signal from the amplifier 240 and outputs the processed signal to the interior of the vehicle. The internal noise of the vehicle may be eliminated or attenuated by the output of the speaker 250. The detailed description thereof will be provided later.

The sensor 200, the microphone 210, the controller 220, the AVN device 230, the amplifier 240 and the speaker 250 may respectively correspond to the accelerometer 120, the microphone 130, the controller 140, the AVN device, the amplifier, and the speaker 150 described with reference to FIG. 1.

Meanwhile, the audio system of the vehicle may diagnose whether the components malfunction. For example, the audio system may detect abnormal signals of the components, and determine that a failure of the controller 220 or the sensor 200 occurs.

Hereinafter, the components of the controller 220 and the amplifier 240 will be described in detail.

The controller 220 includes at least one of a first filter unit 221, a first analog-digital converter (ADC) 222, a second filter unit 223, a second ADC 224, a control signal generator 225 or a control signal transmitter 226. The controller 220 may be implemented with at least one digital signal processor (DSP).

The first filter unit 221 filters a reference signal of the sensor 200. The first filter unit 221 may filter a signal of a specific band in the frequency band of the reference signal. For example, to filter the reference signal of a low frequency band, which is a major noise source in the vehicle, the first filter unit 221 may apply a low pass filter to the reference signal. Besides, the first filter unit 221 may apply a high pass filter to the reference signal.

The first ADC 222 converts a reference signal, which is an analog signal, into a digital signal. The first ADC 222 may convert the reference signal filtered by the first filter unit 221 into a digital signal. To the present end, the first ADC 222 may perform sampling on the reference signal. For example, the first ADC 222 may sample the reference signal at a sampling rate of 2 kHz. In other words, the first ADC 222 may apply down-sampling to the noise control signal. The first ADC 222 may convert the reference signal, which is an analog signal, into a digital signal by sampling the reference signal at an appropriate sampling rate.

The second filter unit 223 filters an acoustic signal of the microphone 210. The acoustic signal includes at least one of a noise signal, an error signal, or an audio signal. The second filter unit 223 may filter a signal of a specific band in the frequency band of the acoustic signal. For example, to filter the acoustic signal of the low frequency band, the second filter unit 223 may apply a low-pass filter to the acoustic signal. Besides, the second filter unit 223 may apply a high pass filter or a notch filter to the acoustic signal.

The second ADC 224 converts an acoustic signal, which is an analog signal into a digital signal. The second ADC 224 may convert the acoustic signal filtered by the second filter unit 223 into a digital signal. To the present end, the second ADC 224 may perform sampling on the acoustic signal. For example, the second ADC 224 may sample the acoustic signal at a sampling rate of 2 kHz. In other words, the second ADC 224 may apply down-sampling to the acoustic signal. The second ADC 224 may convert the acoustic signal, which is an analog signal, into a digital signal by sampling the acoustic signal at an appropriate sampling rate. Thereafter, the acoustic signal converted to the digital signal may be filtered by a high-pass filter.

Meanwhile, in FIG. 2, the first ADC 222 and the second ADC 224 are illustrated as being included in the controller 220. However, as an exemplary embodiment of the present disclosure, the first ADC 222 and the second ADC 224 may respectively be included in the sensor 200 and the microphone 210. That is, a reference signal which is an analog signal may be converted into a digital signal in the sensor 200 and transmitted to the first filter unit 221 of the controller 220. Similarly, an acoustic signal which is an analog signal may be converted into a digital signal in the microphone 210 and transmitted to the second filter unit 223 of the controller 220. In the instant case, the first filter unit 221 and the second filter unit 223 may be digital filters.

The control signal generator 225 generates a noise control signal based on the reference signal converted into a digital signal. The control signal generator 225 may generate a noise control signal further based on the error signal converted into a digital signal.

According to an exemplary embodiment of the present disclosure, the control signal generator 225 may generate a noise control signal using a Filtered-x Least Mean Square (FxLMS) algorithm. The FxLMS algorithm is an algorithm for eliminating structural-borne noises of a vehicle based on a reference signal. The FxLMS algorithm is is configured for using a virtual sensor. The FxLMS algorithm may control noise in consideration of a secondary path indicating a distance between the speaker 250 and the microphone 210. This will be described in detail with reference to FIG. 4.

Furthermore, the control signal generator 225 may control the noise using an adaptive control algorithm. The controller 220 may use various algorithms such as Filtered-input Least Mean Square (FxLMS), Filtered-input Normalized Least Mean Square (FxNLMS), Filtered-input Recursive Least Square (FxRLS), and Filtered-input Normalized Recursive Least Square (FxNRLS).

The control signal generator 225 may receive a feedback signal processed by the amplifier 240 and generate a noise control signal that does not affect the output of the audio signal in consideration of the processed signal of the amplifier 240. The microphone 210 may measure the error signal and the audio signal together. In the instant case, the control signal generator 225 may extract an error signal from the acoustic signal using the processed signal of the amplifier 240, and generate a noise control signal based on the extracted error signal and the reference signal. The generated noise control signal cancels out noise in the vehicle, but does not attenuate the audio signal.

The control signal transmitter 226 transmits the noise control signal generated by the control signal generator 225 to the amplifier 240.

The amplifier 240 includes at least one of a control buffer 241, a pre-processing unit 242, a first attenuation unit 243, an audio buffer 244, an equalizer 245, a calculation unit 246, and a second attenuation unit 247, a post-processing unit 248, or a Digital-Analog Converter (DAC) 249. The amplifier 240 may be implemented using at least one digital signal processor.

The control buffer 241 temporarily stores the noise control signal received from the controller 220. The control buffer 241 may transmit the noise control signal when the accumulated number of the noise control signal satisfies a predetermined condition. Otherwise, the control buffer 241 may store the noise control signal and transmit the noise control signal at regular time intervals. The control buffer 241 transmits the noise control signal to the pre-processing unit 242 and the calculation unit 246.

The pre-processing unit 242 applies up-sampling or filtering to the noise control signal received from the control buffer 241. For example, the pre-processing unit 242 may up-sample the noise control signal at a sampling rate of 48 kHz. The pre-processing unit 242 may improve the control precision for the noise control signal through upsampling. Furthermore, when the noise control signal received from the controller 220 includes noise, the pre-processing unit 242 may eliminate the noise of the noise control signal through frequency filtering. The pre-processing unit 242 transmits the preprocessed noise control signal to the first attenuator 243.

The audio buffer 244 temporarily stores the audio signal received from the AVN device 230. The audio buffer 244 may transmit the audio signal when the accumulated number of the audio signal satisfies a predetermined condition. Otherwise, the audio buffer 244 may store the audio signal and transmit the audio signal at regular time intervals. The audio buffer 244 passes the audio signal to the equalizer 245.

The equalizer 245 adjusts the audio signal for each frequency band. The equalizer 245 may divide the frequency band of the audio signal into a plurality of frequency bands, and may adjust the amplitude or phase of the audio signals corresponding to each frequency band. For example, the equalizer 245 may emphasize the audio signal of the low frequency band weakly adjust the audio signal of the high frequency band. The equalizer 245 may adjust the audio signal according to the control of an occupant. The equalizer 245 transmits the adjusted audio signal to the calculation unit 246.

The calculation unit 246 determines a control parameter based on the noise control signal received from the control buffer 241 and the audio signal received from the equalizer 245.

The calculation unit 246 may determine control parameters based on a relationship between the noise control signal and the audio signal, a characteristic of the speaker 250, a characteristic of a noise signal or a characteristic of an error signal, and the like.

The control parameters may include a first attenuation coefficient for the noise control signal or a second attenuation coefficient for the audio signal. Furthermore, the control parameters may include limit values for the range of the noise control signal or the audio signal. Besides, the control parameters may include various parameter values for active noise control.

The first attenuation unit 243 applies the first attenuation coefficient determined by the calculation unit 246 to the noise control signal, and transmits the attenuated noise control signal to the post-processing unit 248. When the first attenuation coefficient is not determined by the calculation unit 246, the first attenuation unit 243 passes the noise control signal.

The second attenuation unit 247 applies the second attenuation coefficient determined by the calculation unit 246 to the audio signal, and transmits the attenuated audio signal to the post-processing unit 248. When the second attenuation coefficient is not determined by the calculation unit 246, the second attenuation unit 247 passes the audio signal.

The noise control signal and the audio signal are mixed while being transmitted to the post-processing unit 248. That is, the mixed signal is input to the post-processing unit 248.

The post-processing unit 248 performs at least one of linearization or stabilization on the mixed signal. Here, the linearization and the stabilization are to post-process the mixed signal based on the mixed signal of the speaker 250 and the displacement limit.

The DAC 249 converts the post-processed signal which is a digital signal into an output signal which is an analog signal. The DAC 249 transmits the output signal to the speaker 250.

The speaker 250 outputs the output signal received from the DAC 249 in a form of sound waves. The speaker 250 may output the output signal to the interior of the vehicle. The output signal eliminates the noise inside the vehicle while audio according to the audio signal may be output to the interior of the vehicle.

Meanwhile, although it has been described with reference to FIG. 2 that the reference signal and the noise control signal are singular, they may be plural. For example, the controller 220 may obtain reference signals from a plurality of sensors and obtain a plurality of error signals from a plurality of microphones. Furthermore, the controller 220 may generate a plurality of noise control signals and output the plurality of noise control signals through a plurality of speakers.

Furthermore, the controller 220 may control the noise for each seat. For example, the controller 220 may obtain reference signals from a plurality of sensors, obtain error signals from the microphones provided close to the position of a driver's ear, and generate the noise control signals output from the respective speakers based on a plurality of secondary paths from the points at which the noise control signals are generated to the position of the driver's ear through the plurality of speakers.

Figure 3:
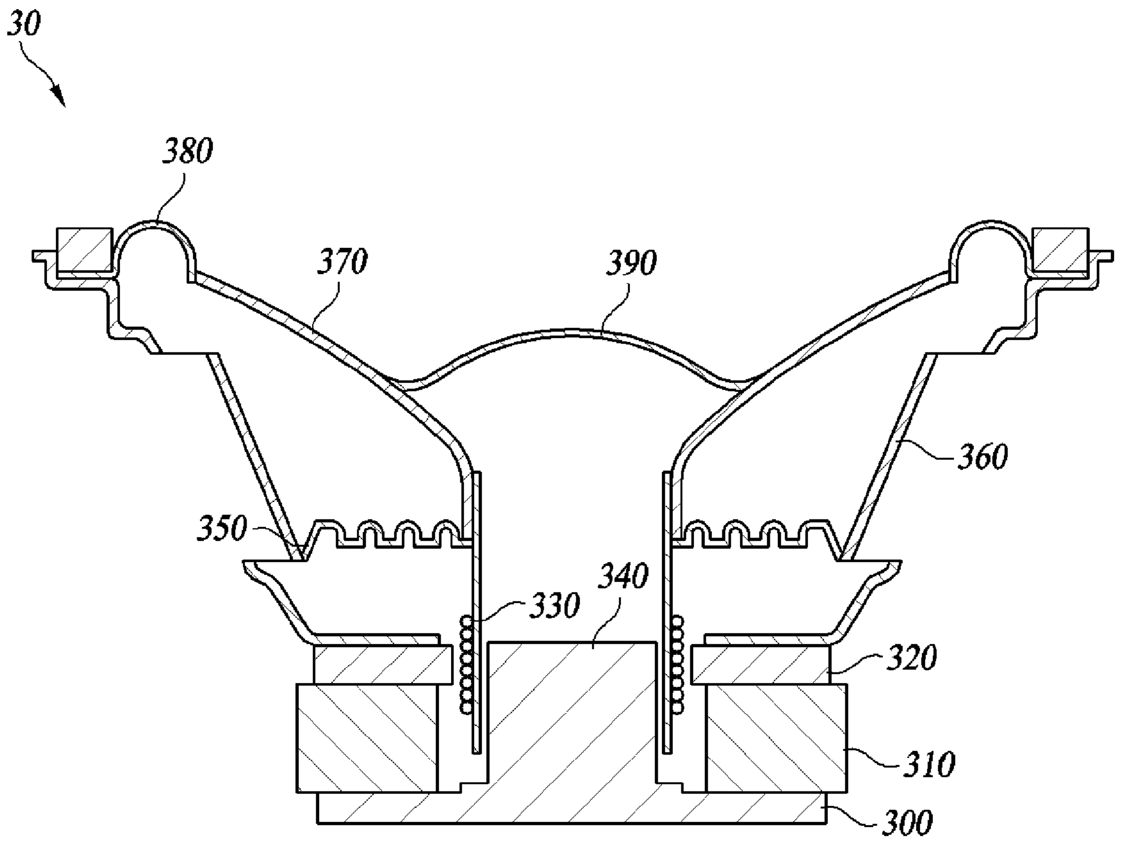
FIG. 3 is a cross-sectional view for explaining displacement of a speaker according to an exemplary embodiment of the present disclosure.

FIG. 3 is a cross-sectional view for explaining displacement of a speaker according to an exemplary embodiment of the present disclosure.

Referring to FIG. 3, the speaker 30 includes a lower plate 300, a magnet 310, an upper plate 320, a voice coil 330, a pole piece 340, and a suspension device 350, a frame 360, a cone 370, a surround 380, and a dusk cap 390.

Although the speaker 30 is expressed as a loudspeaker of a moving coil type in FIG. 3, the speaker 30 may be implemented as a speaker of another type.

The speaker 30 includes a lower plate 300, an upper plate 320, and a magnet 310 provided between the lower plate 300 and the upper plate 320. The lower plate 300 includes a pole piece 340 with a protruding center portion.

The magnet 310 and the upper plate 320 may be formed in an annular shape surrounding the pole piece 340. Furthermore, the voice coil 330 may be provided in a gap space between the pole piece 340 and the upper plate 320, and the voice coil 330 may be provided to be wound around the pole piece 340. The voice coil 330 is attached to a bobbin, and the bobbin may be fixed to the frame 360 through the suspension device 350 including elasticity. The suspension device 350 has a flexible property and may return the position of the voice coil 330.

The lower plate 300, the magnet 310, the upper plate 320, the voice coil 330, and the pole piece 340 form a magnetic circuit. The magnet 310 may be ferrite. When an alternating current is applied to the voice coil 330, the voice coil 330 generates a magnetic field. Here, the alternating current may be an output signal output by the amplifier. The pole piece 340 concentrates the magnetic field generated by the voice coil 330. The magnetic field generated by the voice coil 330 interacts with the magnetic field of the magnet 310. Due to the present interaction, the voice coil 330 moves up and down. The force generated by the interaction between the DC magnetic flux of the magnet 310 and the AC magnetic flux of the voice coil 330 vibrates the voice coil 330 and the cone 370 to generate a sound. The movement of the voice coil 330 is referred to as displacement or excursion. The voice coil 330 generates vibration or oscillation in the cone 370 through the bobbin.

The cone 370 is connected to the frame 360 through the surround 380 having elasticity and vibrates by the voice coil 330. The cone 370 generates a sound while pushing air through vibration.

The dust cap 390 protects the cone 370 from foreign substances.

Meanwhile, the displacement of the voice coil 330 is determined based on various parameters including the magnitude of the alternating current applied to the voice coil 330.

The displacement of the voice coil 330 has a physical limit due to the structure of the speaker 30. Furthermore, the displacement of the voice coil 330 in the speaker 30 may be limited by an external environment such as distortion of an input signal, heat generation, aging, or temperature of the speaker 30. The displacement of the voice coil 330 may be within a permissible displacement range by the output signal applied to the voice coil 330, but on the other hand, the displacement of the voice coil 330 may be outside the permissible displacement range by the output signal. This is called a saturation state. In the instant case, a signal to be output by the speaker 30 may be distorted or malfunction of the speaker 30 may occur.

To solve the above problem of the speaker 30, the amplifier according to an exemplary embodiment of the present disclosure may perform linearization and stabilization. The amplifier may apply linearization and stabilization to the output signal applied to the voice coil 330.

The linearity of the speaker 30 means a linear relationship between the input signal of the speaker 30 and the displacement of the voice coil 330. Within the linear range of the voice coil 330, the displacement of the voice coil 330 may vary linearly with the magnitude of the input signal. On the other hand, when the voice coil 330 operates outside the linear range by the input signal of the speaker 30, the displacement of the voice coil 330 may not vary linearly with the magnitude of the input signal. In the instant case, the amplifier may control so that the linearity between the input signal and the displacement of the voice coil 330 is maintained outside the linear range of the voice coil 330.

The stabilization of the speaker 30 means correcting an eccentric position of the voice coil 330. The voice coil 330 may not be located at the precise center portion of the operating range. For example, the voice coil 330 may vibrate while its position is eccentric downward. In the instant case, the downward movement of the voice coil 330 may be restricted. At the instant time, the amplifier may apply an offset to the input signal of the speaker 30 in consideration of the eccentric position and the center portion of displacement of the voice coil 330.

The amplifier may maintain linearity between displacements of the voice coil 330 and maintain the center portion of the voice coil 330 based on of linearization and stabilization.

Meanwhile, when outputting sound pressure of the same magnitude, it is more difficult for the speaker 30 to output a low frequency signal than a high frequency signal. The sound pressure representing the force pushing the air is proportional to the acceleration of the cone 370. When the input signal is a low frequency signal, the acceleration of the cone 370 according to the low frequency signal is lower than the acceleration of the cone 370 according to the high frequency signal. Accordingly, it is more difficult for the speaker 30 to output a low frequency signal than a high frequency signal.

To output a low frequency signal having the same sound pressure level as the sound pressure level of a high frequency signal, there is a method of making the amplitude of the low frequency signal greater than the amplitude of the high-frequency signal. In the instant case, however, the speaker 30 may malfunction due to heat generation of the voice coil 330 or excessive displacement of the voice coil 330. In the case of the excessive displacement of the voice coil 330, the low frequency signal may be distorted due to non-linearity within the speaker 30. Accordingly, the speaker 30 outputs an abnormal sound.

Furthermore, there is a method of increasing the size of the speaker 30 to output a low frequency signal having the same sound pressure level as the sound pressure level of a high frequency signal. As the size of the cone 370 is increased, the cone 370 can push an increased air amount. However, there is a limit to installing a large speaker in a vehicle. When the speaker 30 is small like a headrest speaker, it is difficult for the speaker 30 to output a low frequency signal having a range of 20 to 500 kHz, which is the main frequency band of the noise control signal. When the audio system tries to forcibly output a low frequency signal which is difficult for the speaker 30 to output through the speaker 30, not only the low-frequency signal but also other signals within the frequency band of the low frequency signal may be distorted due to the non-linearity or saturation of the speaker 30.

When the audio system tries to forcibly output a low-frequency signal which is difficult to be output by the speaker 30 through the speaker 30, not only the low frequency signal but also other signals within the low frequency band may be distorted.

The audio system according to an exemplary embodiment of the present disclosure can completely output a signal in a wide frequency band, and can protect the speaker 30.

Figure 4:
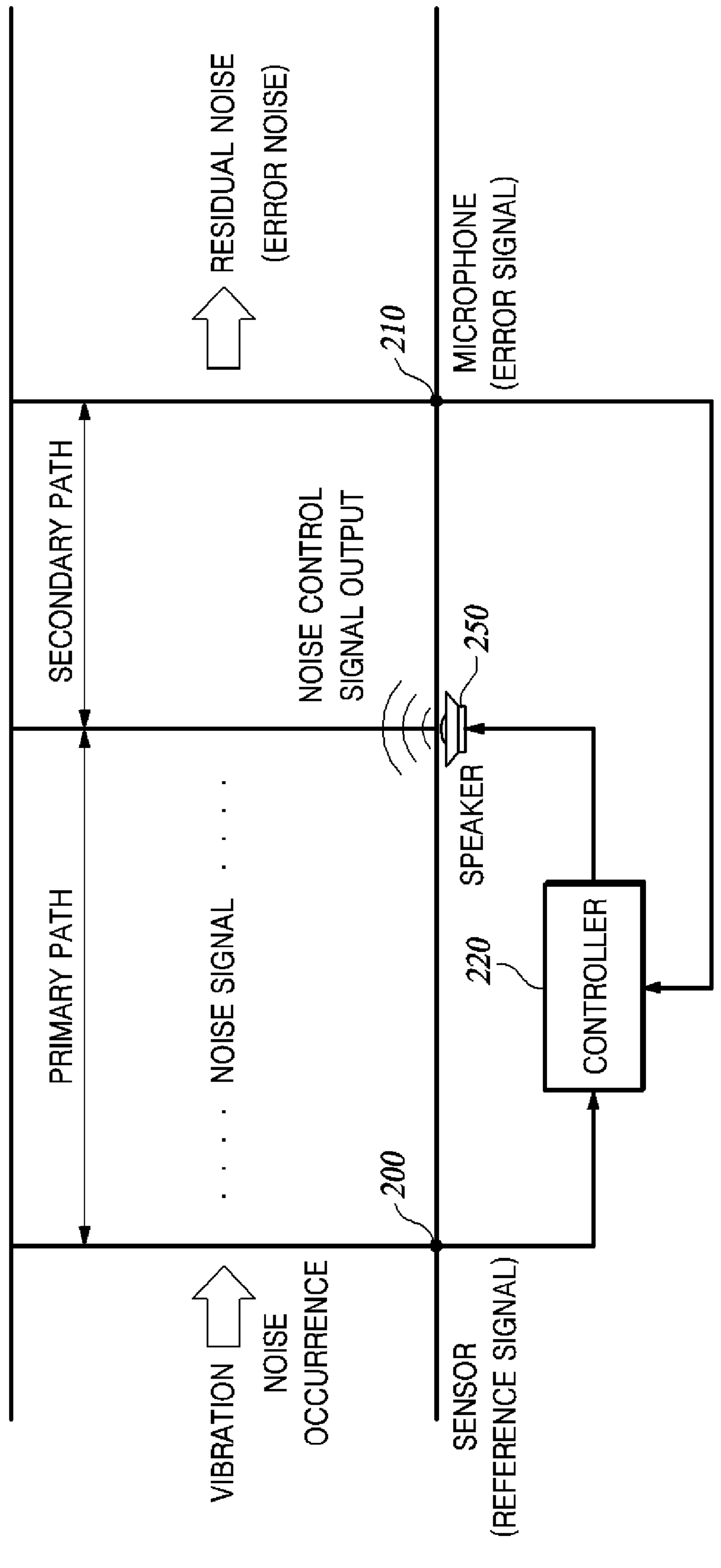
FIG. 4 is a diagram for explaining a process of generating a noise control signal according to an exemplary embodiment of the present disclosure.

FIG. 4 is a diagram for explaining a process of generating a noise control signal according to an exemplary embodiment of the present disclosure.

Referring to FIG. 4, a sensor 200, a microphone 210, a controller 220, and a speaker 250 are illustrated.

According to an exemplary embodiment of the present disclosure, the audio system of the vehicle may eliminate the noise in the vehicle by outputting a noise control signal which is generated based on a reference signal measured by the sensor 200. Furthermore, the audio system may use residual noise remaining after noise cancellation as feedback to maximally eliminate residual noise of the vehicle.

Vibration is generated by friction between the vehicle and the road surface while the vehicle is traveling, and the generated vibration causes noise inside the vehicle.

The controller 220 obtains a reference signal detected by the sensor 200 and predicts a noise signal inside the vehicle based on the reference signal. The controller 220 generates a noise control signal for eliminating the predicted noise signal. The noise control signal is a signal having the same amplitude as that of the noise signal, but having an opposite phase to the phase of the noise signal. The controller 220 outputs a noise control signal through the speaker 250.

In the instant case, a path from the point where the noise signal inside the vehicle is generated to the point where the noise signal is eliminated or attenuated by the noise control signal is referred to as a primary path or a main acoustic path. The primary path may be modeled as a path between the sensor 200 and the speaker 250. In consideration of a transfer function and delay time for the primary path, the controller 220 may generate the noise control signal. In consideration of the transfer function of the primary path, the controller 220 may predict the noise signal at the position of the speaker 250 from the reference signal of the sensor 200, and generate a noise control signal based on the predicted noise signal.

In spite of the output of the noise control signal to eliminate the noise signal, residual noise may remain at the listening position of an occupant. For example, residual noise may be generated because the noise control signal output from the speaker 250 varies while propagating to the listening position of the occupant. For example, the noise control signal may vary by a secondary path such as attenuation due to spatial propagation, noise interference, speaker performance, an ADC, or a DAC. Otherwise, because the noise control signal generated by the controller 220 varies while passing through the amplifier or the speaker 250, residual noise may occur at the listening position of the occupant. Such residual noise may be expressed as an error signal representing the sum of the noise signal and the varied noise control signal at the listening position of the occupant.

For precise noise cancellation, after the noise control signal is output to the interior of the vehicle, the microphone 210 may measure the residual noise inside the vehicle. When the microphone 210 is provided close to the position of the occupant's ear, the error signal may be measured by the microphone 210.

The controller 220 may generate a noise control signal configured for eliminating the error signal using the error signal as feedback.

The path from the point where the noise control signal is generated to the listening point of the occupant is referred to as a secondary path. Here, the secondary path may be modeled as a path between the speaker 250 and the microphone 210. The secondary path may further include a path between the controller 220 and the speaker 250. As the microphone 210 is provided closer to the listening position of the occupant, the microphone 210 can more accurately measure the error signal. The controller 220 may receive the error signal as feedback from the microphone 210 and generate the noise control signal by further considering the transfer function and the delay time for the secondary path.

The controller 220 generates the noise control signal so that the noise control signal varied by the secondary path has the same amplitude as that of the noise signal and the opposite phase to the phase of the noise signal. Accordingly, the error signal may be close to zero.

In the present way, the controller 220 may eliminate the noise signal and the residual noise.

Meanwhile, according to another exemplary embodiment of the present disclosure, the audio system of the vehicle may more accurately model the secondary path using a virtual microphone. The controller 220 may obtain information on the secondary path based on the signal measured by the virtual microphone, and may eliminate noise corresponding to the virtual secondary path.

The controller 220 generates a virtual microphone at a point where an occupant's ear is expected to be located based on information on the occupant's ear position or information on the body of the occupant. When the position of the occupant's ear is changed, the controller 220 may generate a virtual microphone based on the changed position of the occupant's ear. The virtual microphone measures the residual noise at the position of the occupant's ear as an error signal. In the instant case, the controller 220 obtains a path from the point where a virtual noise control signal is generated to the position of the virtual microphone as a virtual secondary path. The controller 220 may generate an error signal measured by the virtual microphone in consideration of the transfer function for the virtual secondary path.

The controller 220 generates a noise control signal based on the virtual error signal.

Through the above process, the audio system of the vehicle can generate a noise control signal based on the virtual secondary path that more accurately models the secondary path. Accordingly, the performance of active noise control may be improved.

Figure 5:
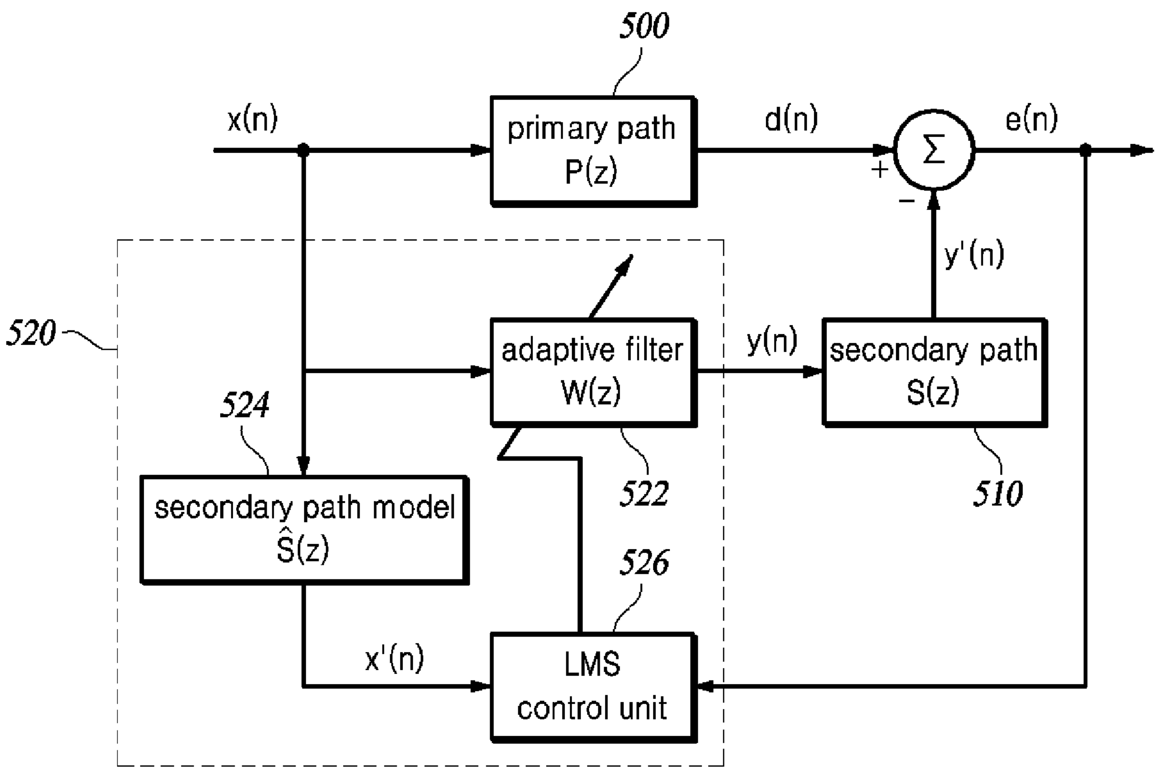
FIG. 5 is a block diagram of a noise control algorithm according to an exemplary embodiment of the present disclosure.

FIG. 5 is a block diagram of a noise control algorithm according to an exemplary embodiment of the present disclosure.

Referring to FIG. 5, a primary path 500, a secondary path 510, a control device 520, an adaptive filter 522, a secondary path model 524, and Least Mean Square (LMS) control unit 526 are shown. The control device 520 may be implemented by the controller 220 and the amplifier 240 in FIG. 2.

The control device 520 is a device configured for controlling the sound, the noise in the vehicle.

The control device 520 may control the noise using an adaptive control algorithm. The control device 520 may use various algorithms such as Filtered-input Least Mean Square (FxLMS), Filtered-input Normalized Least Mean Square (FxNLMS), Filtered-input Recursive Least Square (FxRLS), Filtered-input Normalized Recursive Least Square (FxNRLS), and the like. The control algorithm shown in FIG. 5 relates to a single-channel feedforward FxLMS algorithm. Besides, multi-channel structures with additional channels, additional microphones, and additional speakers may also be employed and an algorithm therefor may be employed.

The control device 520 receives a reference signal x(n) and an error signal e(n), and generates a noise control signal y(n). The reference signal x(n) and the error signal e(n) are measured signals, and the noise control signal y(n) is a signal generated by the control device 520.

The reference signal x(n) is a signal detected by the sensor. For example, the reference signal x(n) may be a measurement signal of an accelerometer or a measurement signal of a vibration sensor.

The reference signal x(n) passes through the primary path 500 and becomes the noise signal d(n).

The noise signal d(n) is a noise at a location that the control device 520 intends to control. For example, the noise signal d(n) may be a measurement of noise at the location of an occupant's ear.

The noise control signal y(n) is a signal for canceling or attenuating the noise signal d(n).

The error signal e(n) is a measurement of the residual noise remaining after the noise signal d(n) is canceled by the noise control signal y(n) at the noise control point. The error signal e(n) may be measured by a microphone. When the microphone measures the error signal and the audio signal together, the control device 520 may identify the error signal because it knows the audio signal.

Meanwhile, the primary path 500 represents a path between the noise source and the noise control point. For example, the primary path 500 may be a path between a sensor sensing the reference signal x(n) and a microphone provided close to the location of the noise signal d(n). In the instant case, the location of the microphone may be approximated to be the location of the occupant's ear, which is the noise control point.

The acoustic transfer characteristics P(z) of the primary path 500 may be derived from the relationship between the reference signal x(n) and the noise signal d(n). For example, as acoustic transfer characteristics of the primary path 500, 'd(n)/x(n)' may be used. The transfer function of the primary path 500 may be determined from the frequency response function of the reference signal x(n) and the noise signal d(n).

In the exemplary embodiment, the acoustic transfer characteristics may be used interchangeably with a transfer function.

The control device 520 generates the noise control signal y(n) to cancel the noise signal d(n). Here, the noise control signal y(n) is a signal which has the same amplitude as that of the noise signal d(n) but has the opposite phase to that of the noise signal d(n).

The control device 520 may use the adaptive filter 522, the secondary path model 524, and the LMS control unit to generate the noise control signal y(n).

The adaptive filter 522 receives a reference signal x(n) and generates a noise control signal y(n) for controlling the noise signal d(n). The transfer function of the adaptive filter 522 may be expressed as W(z), and the transfer function W(z) of the adaptive filter 522 may include at least one filter coefficient. The noise control signal y(n) may be derived by a convolution operation between the reference signal x(n) and the transfer function W(z) of the adaptive filter 520.

The noise control signal y(n) is output by the speaker and propagates to the noise control point to cancel or attenuate the noise signal d(n).

However, the noise control signal y(n) may be changed in a process of propagation to the noise control point. For example, the noise control signal y(n) may be changed by the secondary path such as attenuation by spatial propagation, noise interference, speaker performance, the ADC, or the DAC, which generates an error between the noise signal d(n) and the noise control signal y(n). The generated error is measured by the microphone as an error signal e(n).

The adaptive filter 522 may use the error signal e(n) as feedback to generate a noise control signal y(n) configured for eliminating the error signal e(n). To the present end, the adaptive filter 522 is updated by the LMS control unit 526 based on the secondary path model 524.

The secondary path model 524 is a model for estimating acoustic transfer characteristics of the secondary path 510. When the noise control point and the measurement point of the error signal e(n) are the same, the secondary path model 524 represents the acoustic transfer characteristics for the path between the generation point of the noise control signal y(n) and the measurement point of the error signal e(n).

The acoustic transfer characteristics $\hat{S}(z)$ of the secondary path model 524 may be determined by the noise control signal y(n) and the error signal e(n). When there is no noise in the vehicle, the control device 520 generates the noise control signal y(n), and the speaker outputs the noise control signal y(n) to the interior of the vehicle. In the situation where there is no noise in the vehicle, since the noise signal d(n) converges to 0, the error signal e(n) measured by the microphone is the same as a noise control signal y'(n) which is modified in a process of passing through the secondary path 510. That is, the microphone may measure the modified noise control signal y'(n). Since the control device 520 may know the noise control signal y(n) and the modified noise control signal y'(n), the secondary path model 524 may be obtained from the relationship between the two signals. For example, the transfer function $\hat{S}(z)$ of the secondary path model 524 may be expressed as 'e(n)/y(n)'.

In addition to the above-described modeling method, the secondary path 510 may be modeled by a person skilled in the art using an appropriate method among modeling methods to best describe a physical phenomenon of an actual audio system.

The secondary path model 524 receives a reference signal x(n) and outputs a modified reference signal x'(n). The modified reference signal x'(n) is input to the LMS control unit 526.

The LMS control unit 526 updates the adaptive filter 522 from the modified reference signal x'(n) and the error signal e(n).

The LMS control unit 526 may update the adaptive filter 522 using the following Eqs. (1a), (1b) and (1c).

$$e(n)=d(n)-y'(n) \quad \text{Eq. (1a)}$$

$$W(z+1)=W(z)+\mu\cdot e(n)\cdot x'(n) \quad \text{Eq. (1b)}$$

$$y(n)=W(z)*x(n) \quad \text{Eq. (1c)}$$

In Eqs. (1a), (1b) and (1c), e(n) is an error signal, d(n) is a noise signal, y'(n) is a modified noise control signal, W(z+1) is an updated filter coefficient, W(z) is a current filter coefficient, μ is a convergence coefficient, x'(n) is a modified reference signal, y(n) is a noise control signal, and x(n) is a reference signal. Furthermore, "* operation" represents a convolution operation. As an exemplary embodiment of the present disclosure, the current filter coefficient W(z) may be updated by gradient descent. Meanwhile, the LMS control unit 526 may update the current filter coefficient W(z) based on the least-squares average of the error signal e(n) instead of the error signal e(n).

After the adaptive filter 522 is updated, the adaptive filter 522 generates the noise control signal y(n) so that the noise control signal y'(n) modified by the secondary path 510 has the same amplitude as that of the noise signal d(n) and the opposite phase to that of the noise signal d(n). Accordingly, the error signal e(n) may be close to zero.

Meanwhile, the control device 520 may generate the noise control signal y(n) in the time domain, but may also generate the noise control signal y(n) in the frequency domain or the time-frequency domain. The control device 520 performs Fast Fourier Transform (FFT) on the reference signal x(n) and the error signal e(n), and performs inverse Fast Fourier Transform (IFFT) on the noise control signal y(n) in the frequency domain to be transformed into the time domain. Furthermore, the control device 520 may use various Fourier transforms such as Discrete Fourier Transform (DFT), Discrete Time Fourier Transform (DTFT), Discrete Cosine Transform (DCT), or the like.

Meanwhile, when the control device 520 uniformly utilizes the initially generated secondary path model 524, the accuracy of the secondary path model 524 may decrease according to a change in the secondary path 510.

The secondary path 510 varies depending on an occupant distribution in the vehicle. For example, the secondary path 510 from the speaker provided in the passenger seat to the location of the ear of the occupant sitting in the driver's seat may vary depending on the occupant in the passenger seat. Nevertheless, when the control device 520 generates the noise control signal y(n) based on the secondary path model generated in the absence of an occupant, the error signal e(n) may increase.

Accordingly, the control device 520 needs to revise the secondary path model 524 in consideration of the change in the secondary path 510 depending on the occupant distribution.

Figure 6:
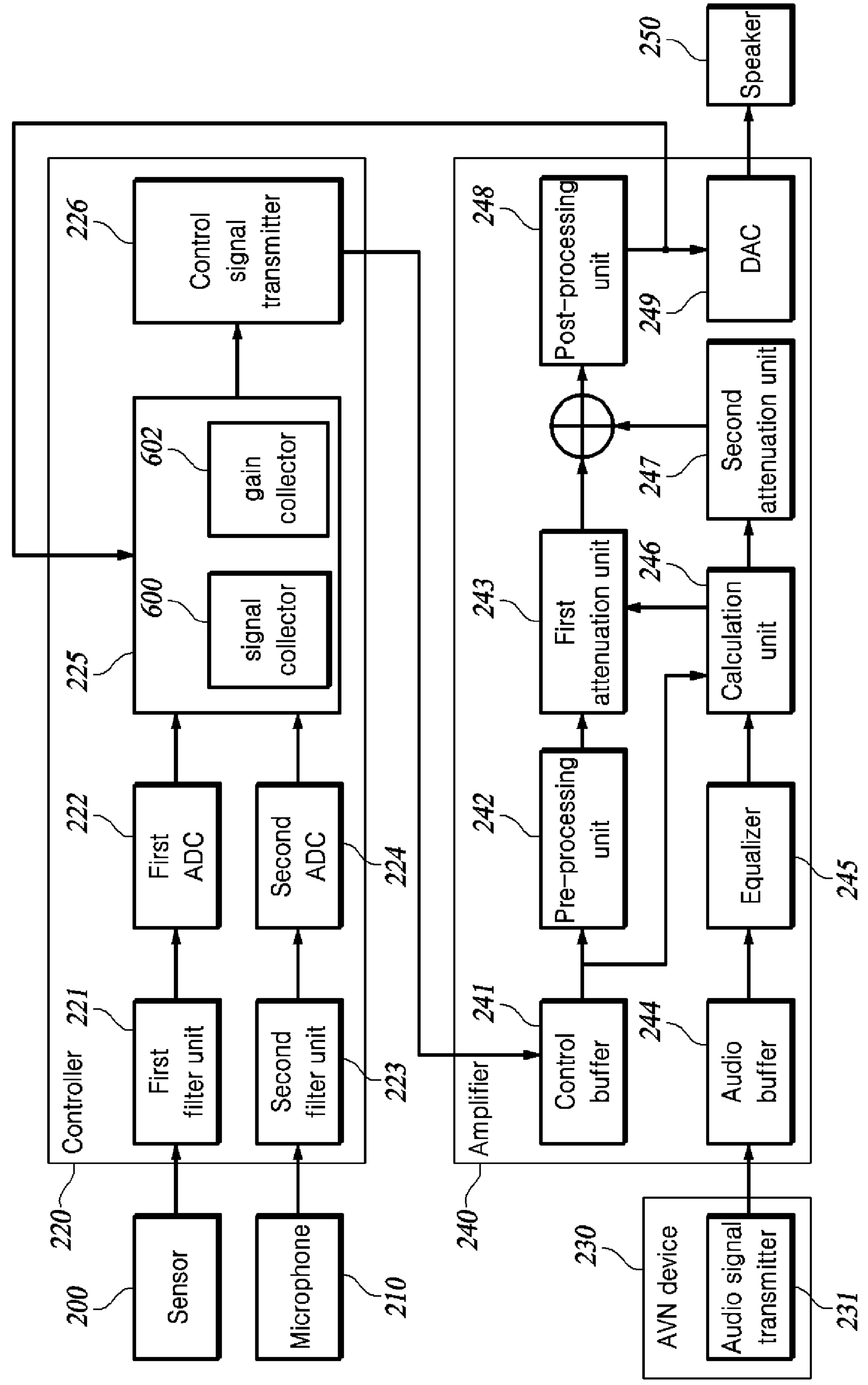
FIG. 6 is a block diagram showing an audio system according to an exemplary embodiment of the present disclosure.

FIG. 6 is a block diagram showing the configuration of an audio system according to an exemplary embodiment of the present disclosure.

The controller 220 shown in FIG. 6 adjusts the magnitude of the noise control signal, which is changed according to the roughness of the road surface, within the limit performance of the speaker 250. Hereinafter, with reference to FIG. 6, to generate a noise control signal having a magnitude within the limit performance of the speaker 250, a method of adjusting a gain for a reference signal and/or an error signal using the controller 220 will be described. Meanwhile, redundant descriptions of the components same as those in FIG. 1, FIG. 2, FIG. 3, FIG. 4, and FIG. 5 will be omitted.

A signal collector 600 obtains at least one of a reference signal of the sensor 200 or an error signal obtained from a sound signal of the microphone 210. Referring to FIG. 6, the signal collector 600 utilizes a post-processing signal processed by the amplifier 240 to extract an error signal from the sound signal of the microphone 210.

An estimator estimates a road surface environment corresponding to the road surface on which the vehicle is traveling based on the reference signal. The estimator estimates a road surface roughness corresponding to the road surface environment based on the reference signal of the sensor 200, e.g., an accelerometer. In case that the estimator estimates the road surface roughness based on the reference signal without using the vision sensor, the amount of computation may be reduced and implementation may be simplified.

In an exemplary embodiment of the present disclosure, the estimator may estimate the road surface roughness by performing an averaging method, an integration method, and a linear regression method on a reference signal converted into a digital signal. Because the method of estimating the road surface roughness based on information collected from the acceleration sensor is known in the art, detailed description thereof will be omitted. The road surface roughness may be expressed as a quantified numerical value according to a known method. The road surface roughness may be determined as any one of preset road surfaces according to a classification algorithm known in the art.

A gain controller 602 adjusts a gain for generating a noise control signal having a magnitude within a preset range, based on at least one of the estimated road surface environment or the error signal. Here, the magnitude within the preset range may be the magnitude of the signal corresponding to a range within the limit performance of the speaker 250. That is, the range of the magnitude of the noise control signal may be variously changed in accordance with the hardware performance of the speaker 250. As the road surface roughness increases, the vibration and noise of the vehicle increase. As described in Eq. (1b), when a magnitude of the error signal or a magnitude of the reference signal increases, the magnitude of the noise control signal also increases. However, when a noise control signal exceeding the limit performance of the speaker 250 is generated, the speaker may malfunction. Accordingly, the gain controller 602 adjusts the gain to generate a noise control signal having a magnitude within a preset range based on the limit performance of the speaker. For example, when the road surface roughness corresponding to the road surface environment is greater than a preset reference value, to generate a noise control signal having a magnitude less than or equal to a preset maximum performance of the speaker 250, the gain controller 602 reduces the gain in response to the increase of the magnitude of reference signal. Here, the gain controller 602 may decrease μ value in Eq. (1b) in response to the increase of the magnitude of reference signal so that the noise control signal has a magnitude less than or equal to the maximum limit performance of the speaker 250. When the road surface roughness corresponding to the road surface environment is smaller than the preset reference value, the gain controller 602 increases the gain in response to the decrease of the magnitude of reference signal to generate a noise control signal having a magnitude greater than or equal to a preset minimum performance of the speaker 250. Here, the gain controller 602 may increase μ value in Eq. (1b) in response to the decrease of the magnitude of reference signal so that the noise control signal has a magnitude greater than or equal to the minimum limit performance of the speaker 250. According to the operation of the gain controller 602, it is possible to stably maintain the noise control signal output within the limit performance of the speaker 250 regardless of the road surface roughness. Furthermore, because the controller 220 outputs a noise control signal according to the road surface, control stability is improved.

The control signal transmitter 226 transmits the noise control signal generated based on the gain adjusted by the gain controller 602 to the amplifier 240.

Figure 7:
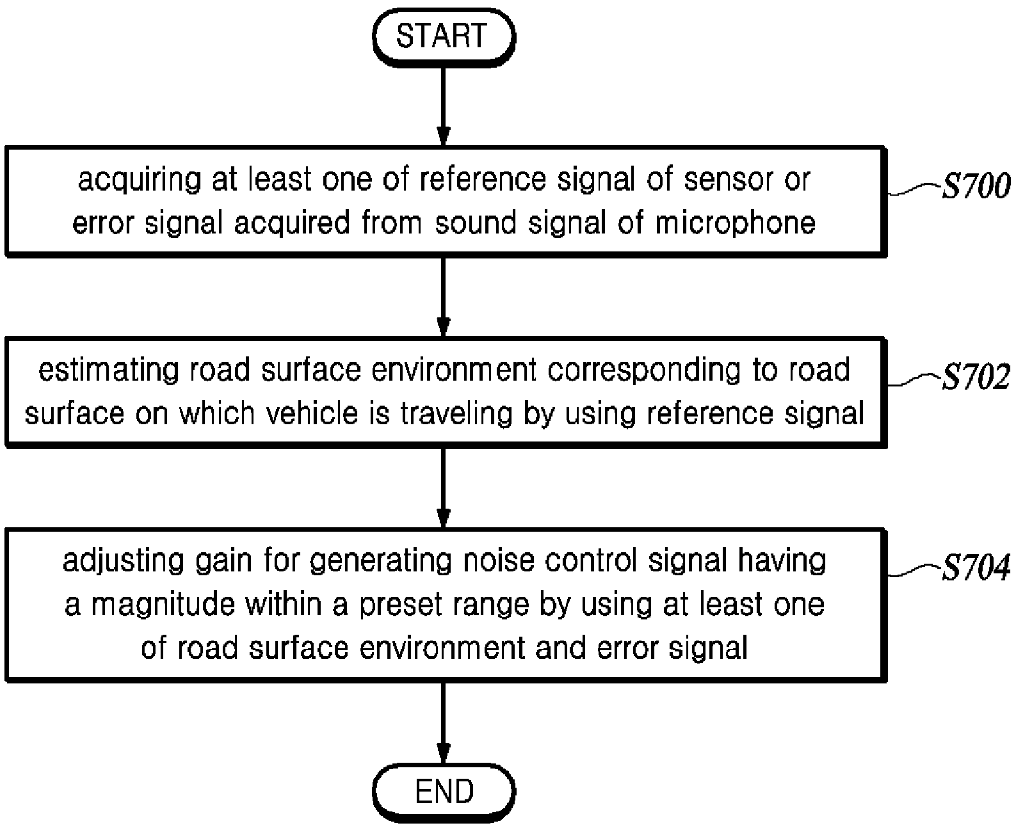
FIG. 7 is a flowchart illustrating a method of operating a sound control device according to an exemplary embodiment of the present disclosure.

FIG. 7 is a flowchart illustrating a method of operating a sound control device according to an exemplary embodiment of the present disclosure.

The signal collector 600 obtains at least one of a reference signal of the sensor 200 or an error signal obtained from a sound signal of the microphone 210 (S700).

The estimator estimates a road surface environment corresponding to the road surface on which the vehicle is traveling based on the reference signal (S702).

The gain controller 602 adjusts a gain for generating a noise control signal having a magnitude within a preset range based on at least one of the road surface environment or the error signal (S704).

As described above, according to an exemplary embodiment of the present disclosure, it is possible to improve the performance of active noise control in consideration of the relationship between the noise control signal and the audio signal, the characteristics of the noise signal, and the characteristics of the speaker.

According to another exemplary embodiment of the present disclosure, by accurately modeling a noise transfer path using a virtual sensor and a virtual microphone, it is possible to improve the performance of active noise control.

According to another exemplary embodiment of the present disclosure, by adjusting the magnitude of the low frequency band of the audio signal depending on the level of the residual noise, the occupant can recognize the audio signal as a constant level even if the level of the residual noise is changed.

According to another exemplary embodiment of the present disclosure, it is possible to maintain the output of the noise control signal within the limit performance of the speaker regardless of the roughness of the road surface, which improves control stability.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) include instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. Furthermore, the computer-readable recording medium may be distributed in a network-connected computer system, and the computer-readable codes may be stored and executed in a distributed manner.

Although it is described that each process is sequentially executed in the flowchart/timing diagram of the exemplary embodiment, this is merely illustrative of the technical idea of an exemplary embodiment of the present disclosure. In other words, because an ordinary skilled person in the art to which the embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a sound control device in a vehicle, the method comprising:

obtaining, by a signal collector, a reference signal obtained from a sensor and an error signal obtained from a sound signal of a microphone;

estimating, by an estimator, a road surface environment corresponding to a road surface on which the vehicle is traveling based on the reference signal; and adjusting, by a gain controller, a gain for generating a noise control signal having a magnitude within a preset range, based on at least one of the road surface environment or the error signal, wherein the adjusting includes:

increasing the gain to generate the noise control signal having the magnitude greater than or equal to a preset minimum performance of a speaker, when the gain controller concludes that a road surface roughness corresponding to the road surface environment is smaller than a preset reference value.

2. The control method of claim 1, further including:

transmitting, by a control signal transmitter, the noise control signal generated based on the adjusted gain to an amplifier.

3. The control method of claim 1, wherein the obtaining includes:

extracting an error signal representing a residual noise in the vehicle from the sound signal, using a feedback signal mixed from an audio signal and a previous noise control signal.

4. The control method of claim 1, wherein the adjusting includes:

reducing the gain to generate the noise control signal having the magnitude less than or equal to a preset maximum performance of the speaker, when the gain controller concludes that the road surface roughness corresponding to the road surface environment is greater than the preset reference value.

5. A non-transitory computer readable storage medium on which a program for performing the method of claim 1 is recorded.

6. A sound control apparatus in a vehicle, the sound control apparatus comprising:

a signal collector configured for obtaining a reference signal obtained from a sensor and an error signal obtained from a sound signal of a microphone;

an estimator configured for estimating a road surface environment corresponding to a road surface on which the vehicle is traveling based on the reference signal; and a gain controller configured for adjusting a gain for generating a noise control signal having a magnitude within a preset range based on at least one of the road surface environment or the error signal, wherein the gain controller is configured to increase the gain to generate the noise control signal having the magnitude greater than or equal to a preset minimum performance of a speaker, when the gain controller concludes that a road surface roughness corresponding to the road surface environment is smaller than a preset reference value.

7. The sound control apparatus of claim 6, further including:

a control signal transmitter configured for transmitting the noise control signal generated based on the adjusted gain to an amplifier.

8. The sound control apparatus of claim 6, wherein the signal collector is configured to extract an error signal representing a residual noise in the vehicle from the sound signal using a feedback signal mixed from an audio signal and a previous noise control signal.

9. The sound control apparatus of claim 6, wherein the gain controller is configured to reduce the gain to generate the noise control signal having the magnitude less than or equal to a preset maximum performance of the speaker, when the gain controller concludes that the road surface roughness corresponding to the road surface environment is greater than the preset reference value.

* * * * *